Oct. 29, 1940.                J. PRICE                 2,219,659
                          HEAT EXCHANGER
                       Filed March 15, 1935          2 Sheets-Sheet 1
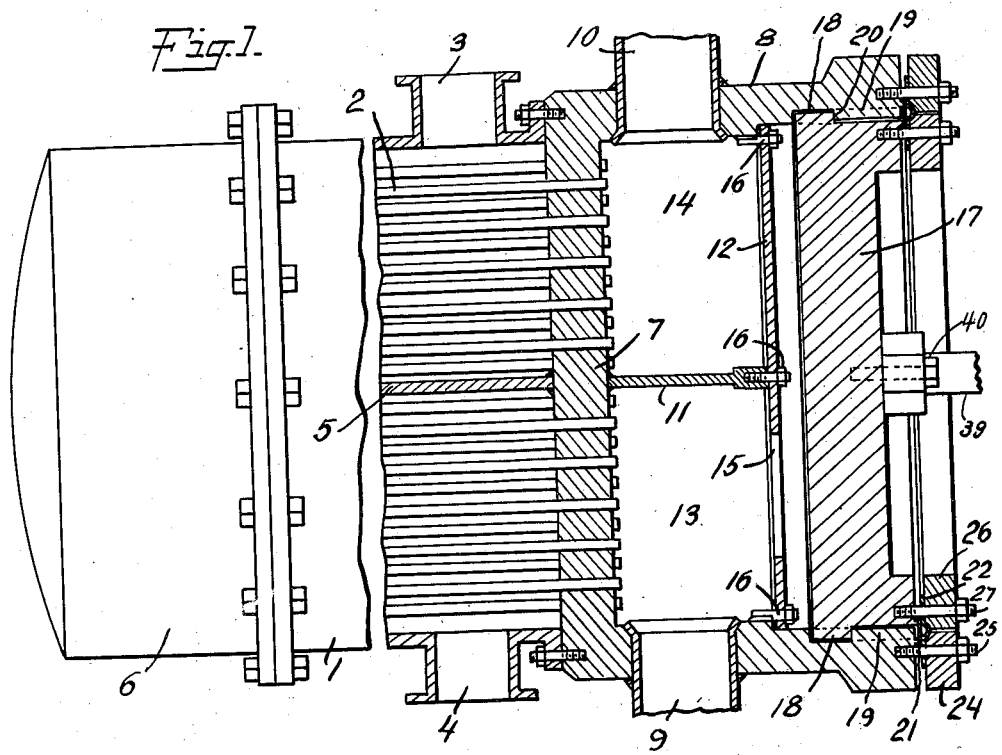
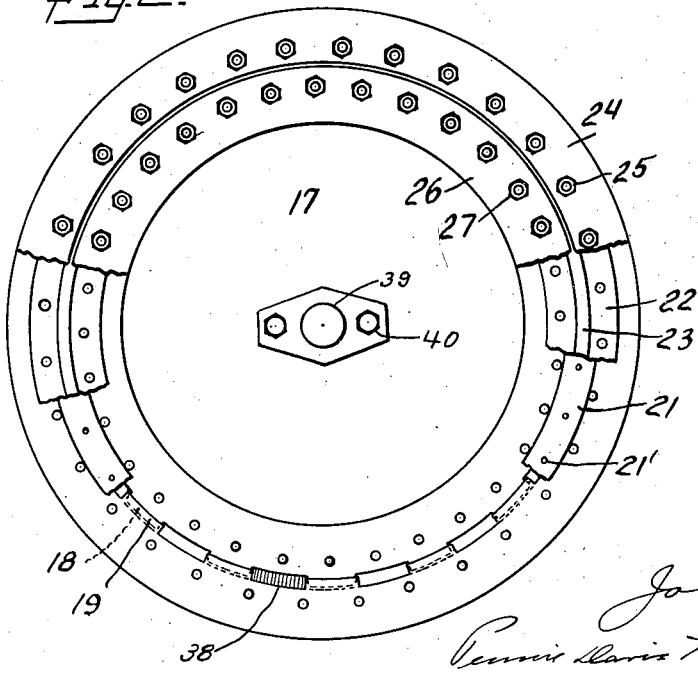
INVENTOR
Joseph Price
BY
ATTORNEYS Oct. 29, 1940.  J. PRICE  2,219,659
HEAT EXCHANGER
Filed March 15, 1935   2 Sheets-Sheet 2

INVENTOR
Joseph Price
BY
ATTORNEYS

Patented Oct. 29, 1940

2,219,659

UNITED STATES PATENT OFFICE 2,219,659

HEAT EXCHANGER

Joseph Price, West New Brighton, Staten Island, N. Y., assignor to The Griscom-Russell Company, New York, N. Y., a corporation of Delaware Application March 15, 1935, Serial No. 11,184

10 Claims. (Cl. 220—46)

This invention relates to heat exchangers and more particularly to heat exchanging apparatus suitable for handling fluids at least one of which is under considerable pressure. An object of the invention is to provide apparatus of this type in which the several parts which are of massive proportions to withstand high pressure, may be assembled with a minimum of effort. A further object is to provide such apparatus in which the repairs necessary for keeping the apparatus in good operating condition can be made without taking the apparatus apart to the extent heretofore regarded as essential, and in which the gasket joints can be inspected and tightened without interfering in any way with the continued use of the apparatus. Still another object of the invention is to provide a heat exchanger for high pressure duty having a head or fluid manifold provided with a cover plate so constructed and arranged with respect to the head that the thrust of the fluid pressure against this plate is transmitted directly to the head instead of to the bolts which secure the head in position.

It is common practice in the heat exchanger art to provide a cover plate for an opening in the heat exchanger head, the cover plate being clamped against the end of the head by a number of bolts or the like. In such apparatus the bolts must be of such dimensions and strength as to withstand the thrust of the fluid pressure against the inner face of the cover plate. It has been found that where this construction is employed in apparatus intended for high pressure duty it is necessary to employ bolts of very large diameter, and in order to provide an adequate factor of safety the calculated bolt dimensions may prove to be of absurd proportions. An object of this invention is to avoid this difficulty even though the cover plate is subjected to very high fluid pressure. In general, this object is attained by providing an interlocking connection between the cover plate and the head, this connection being preferably independent of the fluid tight joint or seal formed around the cover plate. The joint or seal around the cover plate may include gasket means held in position by a clamping ring bolted in place but the arrangement may be such that the thrust of the fluid pressure which must be taken by these bolts is very small compared with the thrust of the fluid pressure against the inner face of the cover plate. In other words, the area of the sealing means exposed to the fluid pressure can be made much smaller than the area of the inner face of the cover plate.

The interlocking connection between the cover plate and the head may be formed in various ways. For example, one preferred form of interlocking connection contemplates the provision of a number of inwardly extending projections around the periphery of the opening in the head and the provision of a corresponding number of outwardly extending projections around the periphery of the cover plate, the arrangement being such that the pressure against the inner face of the cover plate is transmitted to the head through these two sets of projections which may be in direct contact with each other. These projections are preferably so arranged that the cover plate may be inserted in the opening in the head and then turned thru a small angle until the projections on the plates are in alignment with the projections on the head. If desired the cover plate may be locked in this position by any suitable means, for example, by a key member inserted between any two adjacent sets of corresponding projections. After the cover plate has been thus inserted in the opening in the head and turned so that the lugs or projections engage each other, the small clearance space between the plate and the head may be sealed by clamping a gasket, or the like, to the plate and the head so as to form a fluid tight seal around the edge of the cover plate. In this embodiment of my invention the gasket means preferably includes a flexible strip of sheet material and two clamping rings one of which is bolted to the cover plates with the other ring bolted to the head.

According to another embodiment of my invention the cover is locked to the head by means of a locking key engaging the outer face of the cover plate and engaging a keyway formed in the head. Where this construction is employed it is feasible to use a single clamping ring for clamping the gasket means against the head and against the cover plate to form a fluid tight seal.

My invention is particularly suitable for heat exchangers of the shell and tube type in which a tube bundle is enclosed within a cylindrical shell with the tubes mounted in tube sheets one of which may be integral with or otherwise permanently secured to the stationary head of the heat exchanger. Means may be provided for supplying fluid to a chamber within this head and, if desired, it may be equipped with means for causing multi-pass flow of this fluid through the tubes of the tube bundle in the shell. This means may comprise one or more partition plates and a detachable cover plate mounted in the chamber within the stationary head so that the necessary separate chambers within the head are formed without the necessity of having the partition or partitions engage the outer cover plate for the head. Where this construction is employed it is desirable to have an opening in that portion of the inner cover plate which is subjected to the pressure of the fluid entering the head for this serves to equalize the pressure on both sides of this portion of the inner cover plate and to hold the remaining portion of this cover plate firmly against the partition plate as explained in greater detail in the Joseph Price et al. Patent Number 1,897,213.

The various objects of my invention will be more apparent upon considering the following detailed description of certain embodiments thereof illustrated in the accompanying drawings in which—

Fig. 1 is a vertical section view of a heat exchanger embodying my invention.

Fig. 2 is a right end elevation of the apparatus shown in Fig. 1, parts being cut away to show details of construction;

Figure 3:
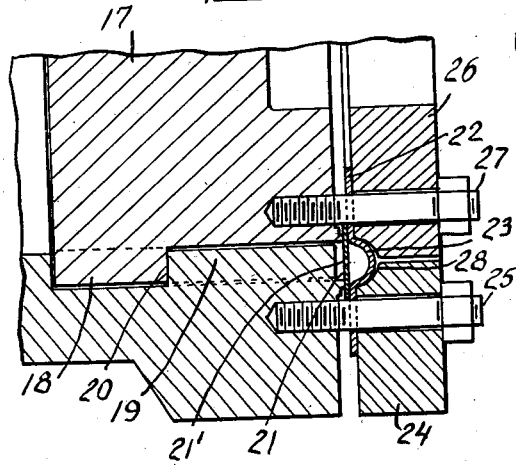
Fig. 3 is an enlarged fragmentary section view of a portion of the stationary head forming a part of the apparatus shown in Fig. 1.

In the apparatus illustrated in Figs. 1 and 2 the numeral 1 designates the cylindrical shell of a heat exchanger. The shell incloses a tube bundle 2 and is provided with a fluid inlet 3 and a fluid outlet 4. A central longitudinal baffle 5 directs the flow of fluid in the shell from the inlet to the outlet. This is in accordance with common practice and it will be understood that the fluid entering through the inlet 3 flows lengthwise of the shell and after passing around the end of the baffle 5 this fluid returns through the bottom section of the shell to the discharge port 4. The shell 1 is provided at one end with a removable cap or bonnet 6 bolted or otherwise secured to the main body portion of the shell. One end of the tube bundle may be mounted in a tube sheet forming a part of the floating head (not shown). This floating head may be located within or near the end cap 6. The other end of the tube bundle is supported by the tube sheet 7 which forms a part of or is carried by the stationary head 8.

The stationary head 8 is provided with a fluid inlet 9 and with a fluid outlet 10. A central baffle or partition 11, cooperating with an inner cover plate 12, directs the flow of fluid into the tubes. The arrangement of the partition 11 and the inner cover plate 12 is such as to provide two chambers within the stationary head 8, one chamber being shown at 13 and the other at 14. It will be understood that fluid entering the chamber 13 through the connection 9 passes through the lower section of the tube bundle to a return bonnet or the like which directs the fluid into the upper section of the tube bundle. The fluid then enters the chamber 14 from which it is discharged through the fluid connection 10.

It will be noted that the inner cover plate 12 is provided with an opening 15 in that portion of the cover plate which is subjected to the pressure of the fluid entering the chamber 13. This serves to equalize the pressure on both sides of this portion of the inner cover plate and it will be understood that by virtue of the drop in pressure through the tube bundle the fluid pressure on the outside of the upper portion of the inner cover plate is greater than the fluid pressure in the chamber 14. This serves to press the cover plate firmly against its seat, where it is normally held in position by a series of bolts 16. This arrangement of the internal cover plate 12 and the central partition 11 is described in greater detail in the above mentioned Patent No. 1,897,213.

The large end-opening in the stationary head is normally closed by a cover plate 17 of massive proportions adapted to withstand high pressures. According to my invention the cover plate 17 is so associated with the body portion of the stationary head that the full thrust of the fluid pressure against the inner face of the cover plate is transmitted to the body portion of the stationary head through an interlocking connection. In Figs. 1 and 2 it will be noted that the marginal portion of the cover plate 17 is provided with a series of projections 18 spaced apart at intervals around the edge of the cover plate. Corresponding projections 19 are provided around the inner periphery of the body portion of the stationary head. These two sets of projections are so formed that the cover plate may be inserted and then turned through a small angle to cause the outer ends of the projections 18 to register with the inner ends of the corresponding projections 19 as shown at 20. This effectively interlocks the cover plate and the body portion of the stationary head and it will be understood that the thrust of the fluid pressure against the inner face of the cover plate is transmitted directly to the body portion of the stationary head through this interlocking connection. It is thus unnecessary to provide bolts for securing the cover plate to the stationary head and this is very advantageous where the apparatus is intended for high pressure duty for under such circumstances the dimensions of the bolts would have to be extremely large.

The operation of inserting the heavy cover plate 17 in the stationary head and the subsequent operation of turning this head through a small angle to bring the projections 18 thereon into interlocking engagement with the projections 19, may be facilitated by providing a handle 39 detachably secured to the cover plate 17 by the bolts 40. This handle may be removed if desired after the cover plate has been placed in position. The cover plate may be locked in place by any suitable means such as the key 38 (see Fig. 2). This key member 38 may consist of a small metal piece which may be inserted in the space between the aligned projections 18 and 19. In removing the cover plate the clamping rings 24 and 26 are first detached, the key 38 removed and then by means of the handle 39 or otherwise the cover plate may be rotated through a small angle to bring the projections 18 on the cover plate into alignment with the spaces between the projections 19. The cover plate may be then withdrawn axially from the stationary head.

The necessary fluid tight seal between the cover plate and the body portion of the stationary head may be formed in various ways, certain preferred constructions being illustrated in the several figures of the drawings. In Figs. 1, 2 and 3 I have shown a gasket 21 in the form of an annular strip of gasket material of sufficient width to bridge the gap between the outer margin of the cover plate 17 and the corresponding outer surface of the body portion of the stationary head. This gasket may be covered by a strip of flexible metal 22 which may have a corrugation 23 disposed in the immediate vicinity of the joint. This flexible strip 23 is in direct contact with the gasket 21 and is held firmly in position by two series of bolts and two clamping rings. An outer clamping ring 24 is normally held in position by a series of bolts 25 and an inner clamping ring 26 is held in position by a second series of bolts 27. These two clamping rings 24 and 26 may be provided with beveled or grooved surfaces 28 adapted to receive the corrugation 23 of the flexible strip 22. The gasket 21 may be provided with a row of openings or vents 21' which serve to equalize the fluid pressure on both sides of the gasket in the vicinity of the corrugation 23. The single gasket 21 forms a seal for both of the circumferential joints formed between the cover plate 17 and the inner ring 26 and between the body portion of the stationary head and the outer ring 24. There is accordingly no tendency for this gasket to blow out under high pressure the gasket being firmly held in position by the two independent sealing rings 24 and 26. The area of the gasket and of the adjacent portions of the sealing rings in the vicinity of the joints, which have to withstand the thrust of the fluid pressure, is relatively small and accordingly the bolts 25 and 27 can be made of relatively small diameter. The major portion of the end thrust caused by the high pressure fluid in the stationary head is transmitted directly to the body portion of the stationary head by the interlocking connection above described and is not transmitted to the bolts which form the fluid tight seal.

It will be noted that if any leak occurs at any point around the circumferential joints this will immediately be evident to an attendant, for the point at which the leakage is occurring is quite exposed. The bolts 25 and 27 in the vicinity of the point where leakage is occurring may be tightened to stop the leak and this may be accomplished without removing the cover plate or otherwise interfering in any way with the continued use of the apparatus. This is very advantageous for the cover plate is very heavy and therefore difficult to remove.

Figure 4:
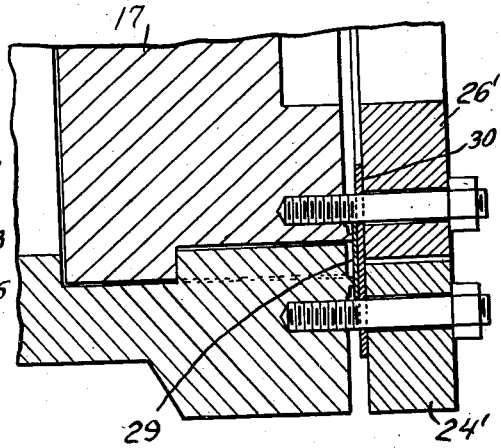
Fig. 4 is a fragmentary section view similar to Fig. 3 but showing a modified construction.

The construction shown in Fig. 4 is similar to that illustrated in detail in Fig. 3, except for the gasket 29 and the flexible metal strip 30. In Fig. 4 the gasket 24 is a plain strip without any central row of perforations, and the flexible metal strip 30 is not provided with any corrugation. The clamping rings 24' and 26' are rectangular in cross section and are not provided with any means for receiving a corrugation as is the case in Fig. 3. The construction employed in Fig. 4 may require more accurate machining of the stationary head and the cover plate in order to insure proper alignment of the outer marginal faces of the cover plate and the stationary head where they engage the gasket. In the construction shown in Figs. 1 to 3, a satisfactory seal may be obtained even though these sealing edges are not in such close alignment.

Figure 5:
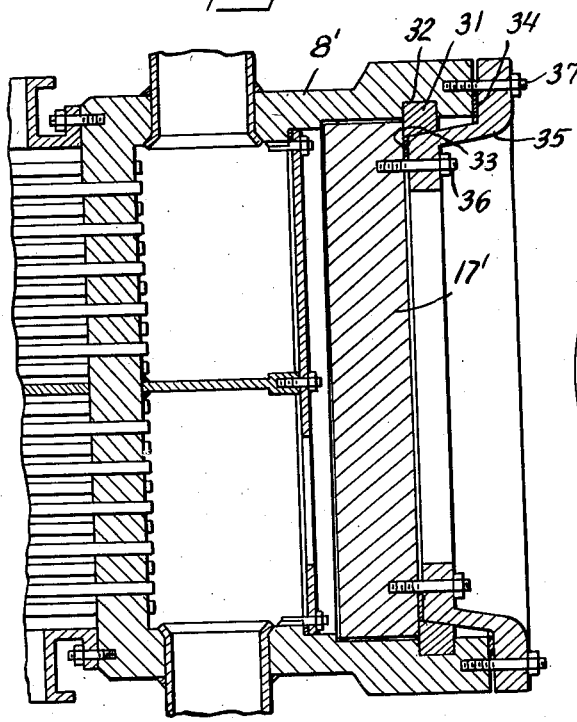
Fig. 5 is a vertical section view of another modification of the stationary head forming a part of the apparatus illustrated in Fig. 1
Figure 6:
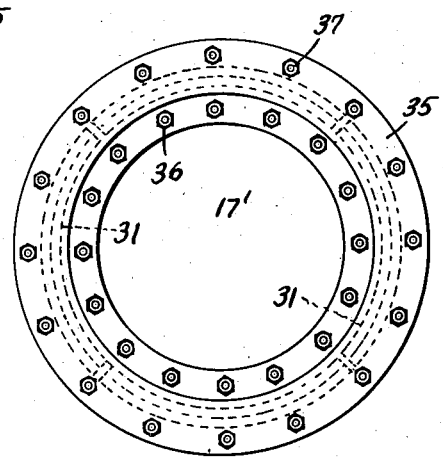
Fig. 6 is an end elevation of the apparatus shown in Fig. 5, this end view being made on a reduced scale.

The modified construction illustrated in Figs. 5 and 6 contemplates the use of a sectional ring-shaped key 31 which engages the marginal portion of the outer face of the cover plate 17' after the same has been inserted through the open end of the stationary head 8'. This sectional ring engages a key-way 32 formed in the inner periphery of the stationary head and serves to interlock the cover plate 17' and the body portion of the stationary head. Where this construction is employed I prefer to use two gaskets one of which is shown at 33 and the other at 34. These two gaskets may be clamped in position by means of a unitary ring 35 and two series of bolts 36 and 37. The bolts 36 secure the inner portion of the ring 35 to the cover plate 17' and the bolts 37 secure the outer portion of the ring 35 to the body portion of the stationary head. In this construction the major portion of the end thrust of the fluid pressure against the inner face of the cover plate is transmitted to the outer portion of the stationary head through the locking key 31, and the seal around the edge of the cover plate is formed by the two gaskets 33 and 34 and the clamping ring 35. All other portions of the apparatus illustrated in Figs. 5 and 6 may be identical with the corresponding portions of the apparatus shown in Figs. 1 to 3 inclusive.

It is to be understood that my invention may be utilized in any one of a variety of specific forms all of which may embody the feature of having the cover plate arranged to transmit the end thrust of the fluid pressure to the body portion of the stationary head through an interlocking connection, or the like. Separate sealing means may be provided for forming a fluid tight joint around the edge of the cover plate and, where my invention is employed, the sealing means is not called upon to carry the full thrust of the fluid pressure against the cover plate.

My invention is not limited to the particular embodiments thereof herein described in detail and illustrated in the accompanying drawings but includes such modifications thereof as fall within the scope of the appended claims.

I claim:

1. In an apparatus of the type described, a head having a chamber therein for receiving a fluid under pressure and an opening for providing access to said chamber, a closure plate for said opening having one side exposed to the interior of said chamber, a gasket engaging the other side of said plate, a second gasket engaging said head around the edge of said plate, a clamping ring engaging both gaskets to form a fluid tight joint around the edge of said plate and means forming an interlocking connection between said plate and said head.

2. In an apparatus of the type described, a head having a chamber therein for receiving a fluid under pressure and an opening for providing access to said chamber, a closure plate for said opening having one side exposed to the interior of said chamber, a gasket engaging the other side of said plate, a second gasket engaging said head around the edge of said plate, a clamping ring engaging both gaskets to form a fluid tight joint around the edge of said plate, and a sectional key forming an interlocking connection between said plate and said head.

3. In an apparatus of the type described, a head having a chamber therein for receiving a fluid under pressure and an opening communicating with said chamber, a closure plate for said opening having one side exposed to the interior of said chamber, sealing means for providing a fluid tight seal around the edge of said plate outside of said plate, a plurality of projections on the interior periphery of said head around the opening therein, a plurality of projections around the edge of said plate and engaging the projections on said head whereby the thrust of the fluid pressure on said plate is transmitted to said head, and means disposed between the projections on said plate and the projections on said head for preventing relative movement of said projections.

4. Apparatus of the type described, comprising a head having a chamber therein and an opening communicating with said chamber, means for supplying fluid to said chamber, a closure plate for said opening said plate having one side thereof exposed to the fluid in said chamber, means for transmitting directly to said head the thrust of the fluid pressure on said plate, a gasket engaging said head and said plate, a strip of sheet material covering said gasket, and means for clamping said strip against said head and against said plate.

5. Apparatus of the type described, comprising a head having a chamber therein and an opening communicating with said chamber, means for supplying fluid to said chamber, a closure plate for said opening said plate having one side thereof exposed to the fluid in said chamber, means for transmitting directly to said head the thrust of the fluid pressure on said plate, a gasket engaging said head and said plate, a strip of sheet material covering said gasket, and means for clamping said strip against said head and against said plate, said gasket having openings therein for equalizing the pressure on both sides thereof.

6. Apparatus of the type described, comprising a head having a chamber therein and an opening communicating with said chamber, means for supplying fluid to said chamber, a closure plate for said opening said plate having one side thereof exposed to the fluid in said chamber, means for transmitting directly to said head the thrust of the fluid pressure on said plate, a gasket engaging said head and said plate, a strip of flexible sheet material covering said gasket, and means for clamping said strip against said head and against said plate.

7. Apparatus of the type described, comprising a head having a chamber therein and an opening communicating with said chamber, means for supplying fluid to said chamber, a closure plate for said opening said plate having one side thereof exposed to the fluid in said chamber, means for transmitting directly to said head the thrust of the fluid pressure on said plate, a gasket engaging said head and said plate, a strip of sheet material covering said gasket and having an annular corrugation therein, and means for clamping said strip against said head and against said plate, said clamping means being of such configuration as to receive and support the corrugated portion of said strip.

8. Apparatus of the type described, comprising a head having a chamber therein and an opening communicating with said chamber, means for supplying fluid to said chamber, a closure plate for said opening said plate having one side thereof exposed to the fluid in said chamber, means for transmitting directly to said head the thrust of the fluid pressure on said plate, a gasket engaging said head and said plate, a strip of sheet material covering said gasket, means for clamping said strip against said head and separate means for clamping said strip against said plate.

9. In an apparatus of the type described a head having a chamber therein for receiving a fluid under pressure and an opening communicating with said chamber, a closure plate for said opening having its inner face exposed to the fluid pressure in said chamber, a key forming an interlocking connection between said plate and said head whereby the thrust of the fluid pressure on said plate is transmitted to said head, gasket means engaging said head and the outer face of said plate, an annular clamping ring engaging said gasket means and said key, and means for securing said ring to said head and to said plate.

10. Apparatus of the type described comprising a head having a chamber therein for receiving a fluid under pressure and an opening communicating with said chamber for providing access thereto, a closure plate for said opening having one side exposed to the interior of said chamber, gasket means engaging the other side of said plate and gasket means engaging said head around the edge of said plate, means forming an interlocking connection between said plate and said head, and clamping means for clamping the gasket means engaging said other side of the plate, and clamping means for independently clamping the gasket means engaging said head around the edge of said plate, the plate being readily removable upon releasing the plate and head gasket clamping means.

JOSEPH PRICE.